United States Patent Office 3,459,416
Patented Aug. 5, 1969

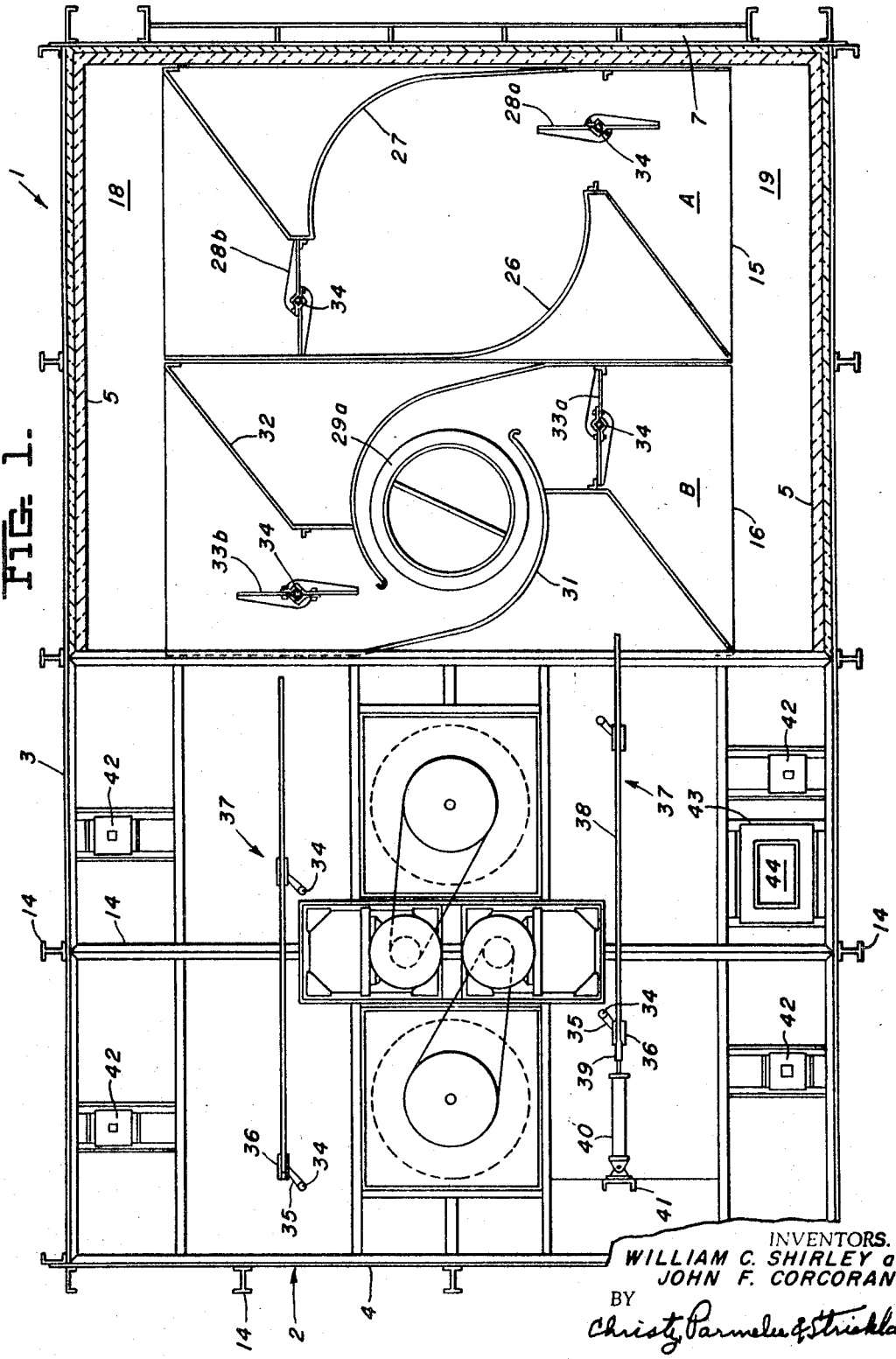

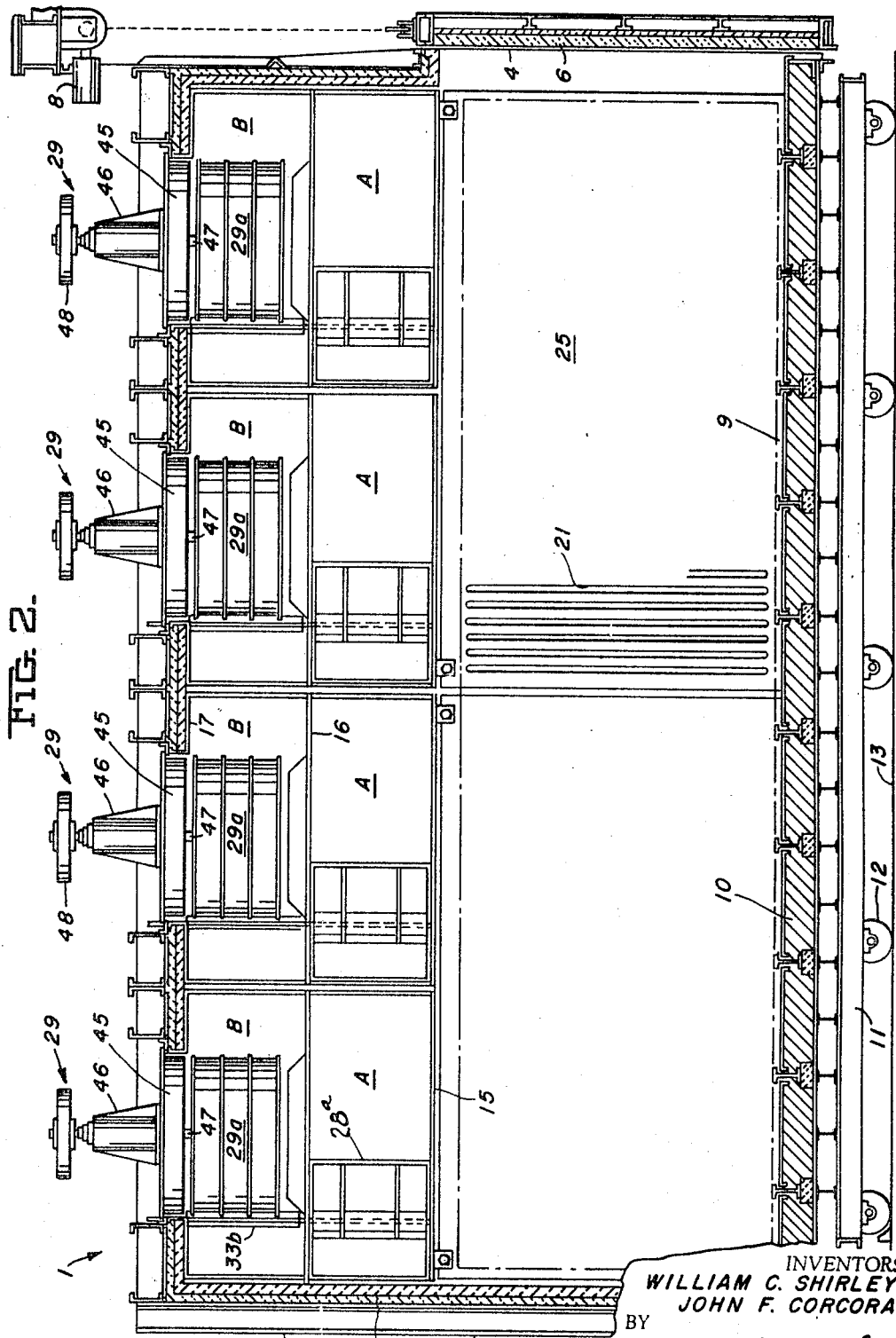

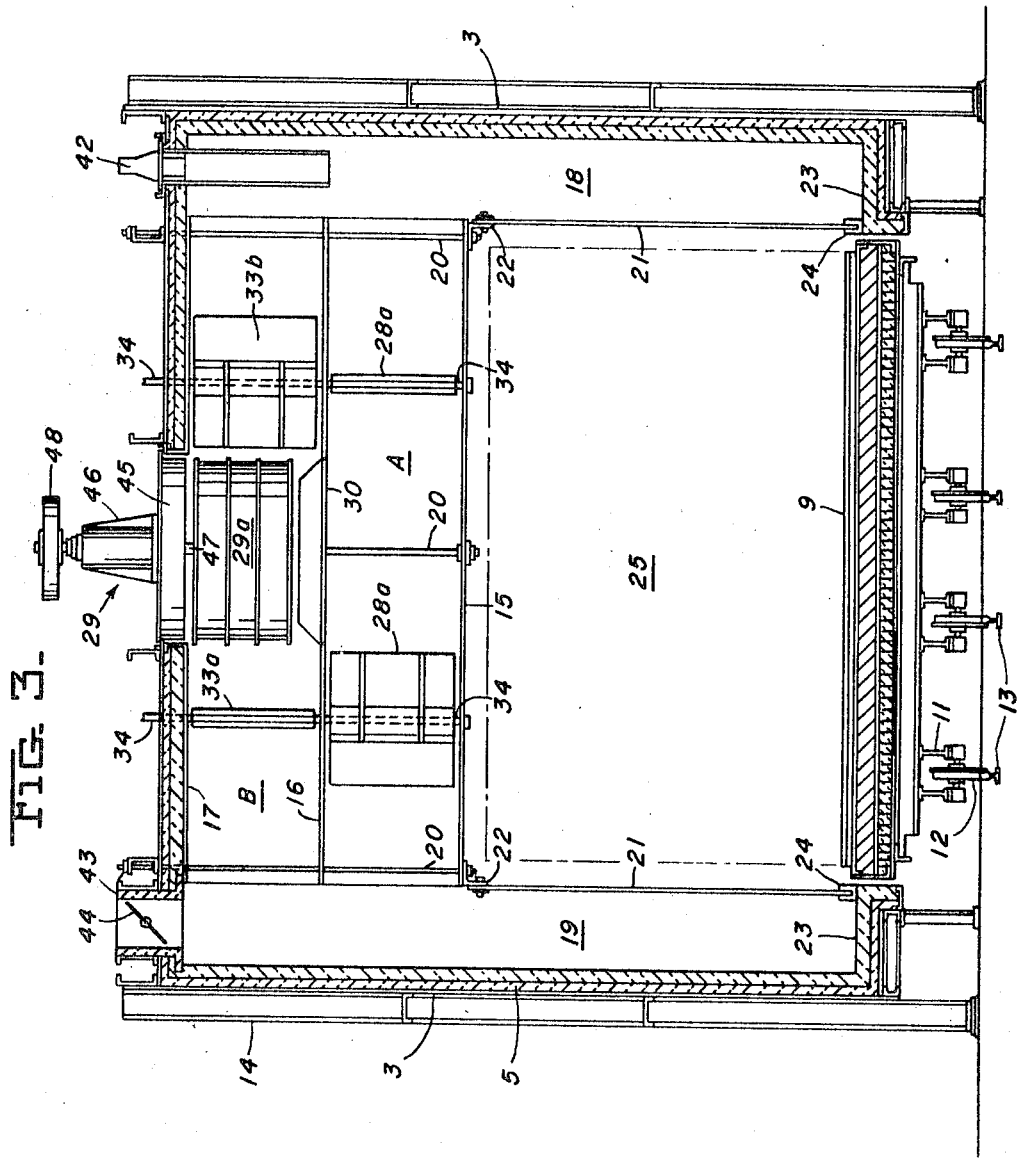

---

3,459,416
INDUSTRIAL FURNACES
William C. Shirley and John F. Corcoran, Lebanon Township, Allegheny County, Pa., assignors to Loftus Engineering Corporation, Pittsburgh, Pa., a corporation of Maryland
Filed June 21, 1965, Ser. No. 465,367
Int. Cl. B21b 7/02; F27d 7/00
U.S. Cl. 266—24                                    4 Claims

ABSTRACT OF THE DISCLOSURE

The present disclosure is concerned with industrial furnaces wherein a plurality of metal objects are uniformly reheated for improving their metallurgical quality wherein the furnace structure provides uniform recirculation of controlled heated air through and around the metal articles alternately from opposite sides of the furnace to effect uniform heating of the entire batch of metal objects and controlled removal of the cooled gases after contact therewith.

---

This invention relates to industrial furnaces in which a batch of metal articles is heated by hot furnace gases flowing over the surfaces of the articles.

The articles in the batch are arranged in spaced relation, whereby the hot gases may flow between the articles from one side or region of the batch and exit from between the articles on the opposite side or region of the batch. In such flow the gases heat the bodies of the articles. Since the gases progressively give up heat in their flow over and between the articles, it will be understood that the temperature of the gases is higher at the entering side of the batch than at the leaving side, with the effect that the temperature of the body portions of the articles adjacent to the entering side of the batch is higher than the body portions adjacent to the leaving side.

In the heating of most metal articles, whether for heat treating or for bringing the articles to rolling, forging or other "working temperature," it is important that the temperature be substantially uniform throughout the bodies of the articles.

Such uniform heating of metal articles has long been recognized as a problem in the metallurgical industries, and in the prior art several solutions of the problem have been proposed. It has been proposed, for example, that the article-heating gases be repeatedly circulated through the batch of articles to be heated, and that in the passage of the recirculated gases between the said leaving and entering sides of the batch heat be added to the gases, either by the combustion of fuel injected into the streaming gases, or by passing the gases over electrical heating elements and/or over the hot surfaces of internally fired radiant tubes. It was found, however, that this recirculation and reheating of the gases, while enhancing the thermal efficiency of the furnace, did not solve the problem of uniform heating. In aiming at a solution of the problem prior inventors have proposed that the direction of flow of the circulating gases be periodically reversed, whereby the entering side of the batch becomes the leaving side and the leaving side becomes the entering side, with the result that the articles are more uniformly heated throughout their bodies.

With this background of the art in mind, it is to be understood that the object of the present invention is to provide an improved, more economical, and particularly effective furnace structure to effect the recirculation and flow reversal of hot gases employed in industrial furnaces of the types to which this specification refers.

Embodiments of the invention are shown in the accompanying drawings, in which:

FIG. 1 shows a longitudinal section through the furnace;

FIG. 2 shows a transverse section through the furnace; and

FIG. 3 shows a partial plan view and sectional view of the furnace.

Referring now in detail to the drawings, the furnace side walls indicated generally as 1 and rear end wall indicated generally as 2 are provided with outer metal faces 3 and 4 respectively and suitable insulation 5. The front face 6 of the furnace is in part similar to that of end wall 2, except that the lower half thereof is provided by a movable door member 7 which may be raised and lowered by any suitable mechanism such as 8. The insulated floor of the furnace is provided in part by a suitable metal faced platform 9, having underlying suitable insulation 10 and mounted upon a suitable wheeled frame 11 having wheels 12 engaging suitable tracks 13 extending from adjacent the furnace rear wall and outwardly through the furnace front wall beneath the door 7. The top wall or roof of the furnace, as shown in part on FIG. 3, has a similar outer metal facing and inner insulation, as do the side and end walls. Suitable vertical and transverse structural members 14 support said side, end and top furnace walls.

The interior of the furnace is divided vertically by a plurality of vertically spaced transversely extending metal plate members 15, 16 and 17, as best shown in FIG. 2. These members 15, 16 and 17 are also spaced longitudinally of the interior of the furnace, as best shown in FIG. 1. Each said members 15, 16 and 17 terminate in spaced relation to the furnace side walls 3 to define therewith longitudinally extending vertically disposed chambers or ducts 18 and 19 into which are injected heated air for a purpose hereinafter discussed.

As best shown in FIGS. 2 and 3 of the drawing, plates 15, 16, and 17 are supported from the roof of the furnace by suitable rod like members 20. At each side of each plate member 15 are suitable slotted or perforated plate members 21, suitably connected thereto as at 22 and extending downwardly therefrom to the furnace bottom wall portions 23 and suitably attached thereto by suitable means such as 24. These plates 15 and 21 define a heating chamber 25 overlying and enclosing the car bottom member 9 upon which the metal members to be heated are disposed.

As best illustrated in FIGS. 1 and 2, the area between each vertically spaced pair of plates 15 and 16 define transversely disposed open ended heated air or gases intake chambers A wherein the suitably shaped vertically disposed members 26 and 27 connecting said plates, divert the incoming gases towards two transversely spaced damper members 28a and 28b. Such dampers, as shown, are alternately opened and closed to control intake of heated gases from either chamber 18 or 19 at the sides of the furnace for discharge through opening 30 into fan 29a.

The areas between the vertically spaced plates 16 and 17 define transversely disposed open ended air discharge chambers B which overlie the open ended intake chambers between plates 15 and 16. As best illustrated in FIGS. 2 and 3, there are four suitable fan assemblies 29 spaced longitudinally of the furnace, at the centerline thereof, and each assembly includes a suitable fan 29a disposed within each chamber B. These fans are suitably designed for high temperature operation and are provided with a suitable plenum housing providing double outlet discharge and single inlet intake. Underlying each fan is a suitable opening 30 FIG. 3 in plate 16 communicating with the underlying heated air intake chamber A. Suitably shaped vertically extending members 31 and 32 connect plates 16 and 17 at opposites of each fan 29a. Dampers 33a and 33b at opposite sides of the fan control the direction of discharge of air from fan 29a to opposite ends of the chamber. Dampers 33a and 33b are mounted on common shafts 34 with dampers 28a and 28b. However, each pair of dampers on each shaft 34 are so disposed that when associated dampers 28a is open, damper 33a is closed. Likewise, when damper 33b is open, underlying damper 28b is closed.

As best shown in FIGS. 1 and 3, each damper shaft 34 extends upwardly through the furance roof and is provided with a crank arm 35 which is pivotally connected at its outer end 36 to a damper operating mechanism indicated generaly at 37. Said operating mechanism 37, at opposite sides of the furnace longitudinal centerline, comprises a rod 38 disposed above said furnace and extending longitudinally thereof transversely of each damper shaft 34. One end of said rod is connected with a reciprocating piston and rod 39 disposed in a suitable pneumatic cylinder 40 anchored to a suitable support such as an adjacent roof member 41. As shown in FIG. 3, damper operating mechanisms 37 are at opposite sides of the furnace longitudinal centerline. Although not shown it will be understood that each fluid pressure actuated cylinder 40 will be provided with a suitable source of fluid pressure and control means whereby the dampers 28a, 28b, 33a and 33b may be selectively moved any amount between fully opened and fully closed for a purpose hereinafter discussed. Additionally, the aforesaid fluid pressure control means will also include a timing device whereby said dampers may be actuated to any degree at any desired time interval. Such controls are conventional and for this reason their specific type or location has not been described.

Referring now to FIGS. 2 and 3, the chambers 18 and 19 at opposite sides of the heating chamber 25, extend substantially the length and height of the furnace and are closed at the bottom by furnace wall 23. Spaced longitudinally of the top of chambers 18 and 19 are a plurality of suitable burners 42, which project into said chambers for injection of the products of combustion of a suitable fuel. Although not shown, it will be understood that each burner 42 has associated therewith suitable conventional fuel and air lines, mixers and ignition means. Preferably burners 42 at opposite sides of the furnace would be grouped adjacent the transverse centerline through fans 29. It will be understood, that where desired, radiant tube type heaters may be substituted for the open burners shown.

At least one of the said furnace side chambers 18 and 19 would be provided adjacent the furnace roof with suitable flues 43 and dampers 44 which are connected to a suiable stack (not shown) for venting the combustion gases from the furnace. Damper 44 may be actuated either manually or by other suitable means.

As a matter of convenience and for maintenance, fan assemblies 29 are preferably supported upon means 45 detachably secured to the roof and embodying a bearing stand 46, suspending the fan shaft 47 and fan 29a within chamber B. The outer end of each shaft 47 may mount a motor, but preferably is provided with a pulley 48 which may be driven by a suitable drive means 49a from a suitable motor 49 located adjacent the fan assembly upon the outer face of the roof surface, as indicated on FIG. 3.

The herein described furnace is intended for reheating metals in various forms preparatory to further processing. Such metals may be steel, aluminum, etc., and various alloys of such metals. In certain uses of the invention it may be necessary only to raise the materials to a preselected temperature, other metals may require retention at pre-selected temperatures for metallurgical purposes, as where alloys of the metal may be retained at certain temperatures to homogenize the privously partially fabricated shapes.

Assuming now that the car 9, having loaded thereon various metal forms to be reheated, has been moved into the furnace, that door 6 has been moved to closed position and any necessary furnace atmosphere purging operations have been completed, the burners 42 are ignited in the customary manner and the dampers 44 in flues 43 are suitabley adjusted for carrying off the products of combustion from the burners 42.

The fan assemblies 29 are actuated and also the control devices for actuating the dampers 28 and 33, which latter for purposes of this description will initially be set to the positions shown in FIGS. 2 and 3. When so positioned, fans 29a withdraw the heated products of combustion from chambers 18 and 19 through the heating chamber 25 into the left sides of chambers A and upwardly therefrom through openings 30 of plates 16 into the fan 29a and discharge same through open dampers 33b of chamber B into chamber 18. Thus, heated air from chambers 18 and 19 is recycled through chamber 25 from right to left, thereby heating the metals mounted therein upon car 9.

As a consequence of such circulation from chamber 19 through chamber 25 into chamber 18, the metals in chamber 25, adjacent chamber 18, being initially contacted by the incoming heated gases are initially raised to a higher temperature than those metals adjacent chamber 19. However, by suitable actuation of the dampers 28 and 33, to open damper 28b and close damper 28a in chamber A, whilst concurrently opening damper 33a and closing damper 33b in chamber B; fan 29a in each chamber B now withdraws heated gases from chamber 18 through damper 28b of chamber A and discharges same through damper 33a of chamber B into chamber 19 and therefrom through wall 21 and chamber 25 to reverse the direction of flow of gases through chamber 25 and over the metals disposed therein. This causes the metals within chamber 25 and adjacent chamber 19 to be first contacted by the heated gases and to initially increase in temperature to re-establish substantial uniform temperature within the load and thereafter the metals adjacent chamber 19 are brought to a higher temperature than are the metals at the exiting side of the gases adjacent chamber 18.

By means of suitable temperature sensing instruments, the damper control mechanisms can be suitably actuated to periodically reverse the direction of flow of heated gases through the load within chamber 25 to gradually raise the temperature through said load to that desired, or to substantially hold the load to a desired temperature. Since the temperatures to which the load within chamber 25 will be heated may vary, the heat input to chambers 18 and 19 will also be varied to meet changing conditions. Additionally, during the heating-up period the dampers may be actuated at intervals when the metals in chamber 25 at the incoming side of the gases reaches a pre-selected temperature differential over metals adjacent the gases exiting side of chamber 25 and later as the load approached a pre-selected overall temperature the time interval of operation of the dampers 28, 33 may be changed to maintain a less temperature differential adjacent opposite sides of chamber 25. Experience has shown that temperature differentials in the load as low as $\pm 5°$ F. can be maintained adjacent chambers 18 and 19, both during the heating-up period and during any soaking period.

Having thus described a presently preferred form of our invention, it is to be understood that we do not intend to be bound by any specific details of construction disclosed herein, except as made necessary by the appended claims.

We claim:

1. In a reheating and heat treating furnace having insulated side, end and top walls, with one said end wall provided with an opening therethrough for reception of a load of metal members for reheating and a movable door for closing said opening, the combination of (a) a reheating chamber extending longitudinally of the furnace between the end walls thereof in spaced relation to said furnace side walls and defined by perforated chamber side walls and an imperforated top wall disposed in vertically spaced relation below the furnace top wall, (b) a plurality of transversely disposed vertically aligned pairs of abutting open-ended ducts overlying said reheating chamber throughout the length thereof between the top wall thereof and the furnace top wall and having their open ends in substantially vertical alignment with said chamber perforate side walls, (c) each said pairs of open-ended ducts, at the longitudinal centerline of the furnace having a common opening connecting the interiors thereof and each said ducts having a pair of dampers therein arranged on opposite sides of said common opening with the dampers within overlying ducts mounted upon a common shaft whereby the upper damper is in closed position when the lower damper is in open position, (d) suitable fan means within the upper of each said pair of ducts and overlying said common opening therebetween for withdrawing heated gases through the end of the bottom ducts adjacent the open damper and discharging same through the open damper adjacent the opposite end of the upper duct, (e) combustion burners spaced longitudinally of said furnace at each side of said reheating chamber for injecting heated gases downwardly at each side of said reheating chamber across the open ends of said ducts and the perforate side walls of said chamber, and (f) means for selectively actuating said dampers to alternately flow heated air through one side of said heating chamber perforations and withdraw the heated air therein from the opposite side of said chamber.

2. In a reheating and heat-treatment furnace having insulated side, end and top and bottom walls and an opening in one end wall for reception of metal articles to be heated and closed by a movable door, in combination, (a) means defining a heating chamber with perforate side walls extending longitudinally of said furnace, with said perforate side walls in spaced relation to the furnace side walls and an imperforate connecting top wall disposed in vertically spaced relation to said furance top wall, (b) means in said furnace top wall for injecting heated products of combustion into said furnace interior between said heating chamber side walls and the furnace side walls and for venting said combustion products to the atmosphere, (c) means disposed between said heating chamber imperforate top wall and said furnace top wall along the length of said heating chamber for selectively withdrawing the heated products of combustion at a side of said heating chamber through the perforate side walls thereof and across the imperforate top of said heating chamber for recycling said heated products of combustion through said heating chamber and the metal articles therein, (d) mechanism for actuating said last-named means for periodically reversing the direction of the recycling flow of said heated products of combustion, and (e) control means for determining the length of time said combustion gases are to be recycled in a given direction through said heating chamber and for reversing the direction of said recycling.

3. The furnace as defined in claim 2, wherein the means for recycling heated products of combustion through said heating chamber comprises (a) a plurality of pairs of superposed open ended ducts disposed transversely of the said heating chamber top wall for substantially the length thereof, (b) a combustion gas recirculating fan within the uppermost of each said pair of superposed open ended ducts adjacent the longitudinal centerline of the furnace and an opening in the top wall of the underlying open ended duct beneath said fan, (c) damper means in each of said pairs of superposed ducts adjacent the open ends thereof, with both said damper means at each end of said pairs of superposed ducts being mounted upon common vertical shafts extending upwardly therefrom through said superposed ducts and the furnace top wall, whereby when the uppermost damper of a shaft is in fully open position the lowermost damper is in fully closed position, and (d) damper shaft actuating means at opposite sides of the furnace longitudinal centerline and connected with the adjacent damper shafts for selectively actuating said dampers from fully open to fully closed positions whereby all dampers adjacent one end of the uppermost of the superposed ducts are in fully closed positions when the corresponding dampers at the opposite ends of the same ducts are in fully open position.

4. The furnace as defined in claim 2, wherein said heating chamber includes a movable imperforate bottom wall for receiving the metal articles to be heated therein.

References Cited

UNITED STATES PATENTS

| 2,311,350 | 2/1943 | Richardson | 266—5 |
| 2,839,285 | 6/1958 | Vickers | 263—42 |
| 3,109,877 | 11/1963 | Wilson | 266—5 |
| 3,174,883 | 3/1965 | Hazen et al. | 266—5 XR |
| 3,261,596 | 7/1966 | Bowman | 266—5 XR |

J. SPENCER OVERHOLSER, Primary Examiner

EUGENE MAR, Assistant Examiner

U.S. Cl. X.R.

266—30